(12) United States Patent
Kim et al.

(10) Patent No.: US 7,714,970 B2
(45) Date of Patent: May 11, 2010

(54) LIQUID CRYSTAL DISPLAY DEVICE HAVING A PIXEL INCLUDING FOUR SUB-PIXELS

(75) Inventors: Woo-Hyun Kim, Seoul (KR); Sung-Soo Chang, Seoul (KR)

(73) Assignee: LG. Display Co., Ltd., Seoul (KR)

(*) Notice: Subject to any disclaimer, the term of this patent is extended or adjusted under 35 U.S.C. 154(b) by 1018 days.

(21) Appl. No.: 11/437,990

(22) Filed: May 19, 2006

(65) Prior Publication Data
US 2006/0262262 A1 Nov. 23, 2006

(30) Foreign Application Priority Data
May 23, 2005 (KR) .................... 10-2005-0043108

(51) Int. Cl.
*G02F 1/1343* (2006.01)

(52) U.S. Cl. .................... 349/144; 349/143; 345/92

(58) Field of Classification Search .................... 345/87, 345/88, 90, 92; 349/141–144, 146
See application file for complete search history.

(56) References Cited

U.S. PATENT DOCUMENTS

| | | | |
|---|---|---|---|
| 7,057,696 B2 * | 6/2006 | Yoo et al. | 349/141 |
| 2004/0169807 A1 * | 9/2004 | Rho et al. | 349/139 |
| 2005/0094078 A1 * | 5/2005 | Kang | 349/141 |
| 2005/0128413 A1 * | 6/2005 | Son et al. | 349/143 |
| 2005/0243262 A1 * | 11/2005 | Kim et al. | 349/156 |

FOREIGN PATENT DOCUMENTS

| | | |
|---|---|---|
| CN | 1484071 A | 3/2004 |
| JP | 10-123501 | 5/1998 |
| JP | 2004-078218 | 3/2004 |
| JP | 2004-280111 | 10/2004 |
| JP | 2005-062869 | 3/2005 |
| JP | 2005-099797 | 4/2005 |
| JP | 2005-512153 | 4/2005 |
| WO | 2005/015296 A1 | 2/2005 |

OTHER PUBLICATIONS

First Office Action for corresponding Chinese Patent Application Serial No. 200610080964.7, dated Nov. 2, 2007.
Office Action issued in corresponding Chinese Patent Application No. 200610080964.7; issued Jan. 9, 2009.
Office Action issued in corresponding Japanese Patent Application No. 2006-142236; mailed Jun. 17, 2009.
Office Action issued in corresponding Japanese Patent Application No. 2006-142236; mailed Dec. 16, 2009.

* cited by examiner

*Primary Examiner*—Chanh Nguyen
*Assistant Examiner*—Kwang-Su Yang
(74) *Attorney, Agent, or Firm*—Brinks Hofer Gilson & Lione

(57) ABSTRACT

A liquid crystal display ("LCD") device includes a white sub-pixel that has a smaller size than other sub-pixels thereby increasing the brightness and the color purities of the other colors, which improves image quality. An LCD device has the common and pixel electrodes on the same substrate and may be formed of a transparent conductive material to increase the brightness further.

20 Claims, 13 Drawing Sheets back light

LIQUID CRYSTAL DISPLAY DEVICE HAVING A PIXEL INCLUDING FOUR SUB-PIXELS

This application claims the benefit of Korean Patent Application No. 2005-0043108, filed in Korea on May 23, 2005, which is hereby incorporated by reference for all purposes as if fully set forth herein.

BACKGROUND

Liquid crystal display ("LCD") devices have been regarded as next generation display devices by providing increased value because of their low power consumption and high portability. An LCD device is driven based on optical anisotropy and polarization characteristics of a liquid crystal material. In general, an LCD device includes two substrates, which are spaced apart and facing each other, and a liquid crystal layer interposed between the two substrates. Each of the substrates includes an electrode. The electrodes from respective substrates face one the other. An electric field is induced between the electrodes by applying a voltage to each electrode. An alignment direction of the liquid crystal molecules changes in accordance with a variation in the intensity or the direction of the electric field. The LCD device displays a picture by varying light transmittance according to the arrangement of the liquid crystal molecules.

Generally, the LCD device is manufactured by fabricating an array substrate including a thin film transistor and a pixel electrode, fabricating a color filter substrate including a color filter and a common electrode, and interposing a liquid crystal layer between the array substrate and the color filter substrate. In addition, active matrix liquid crystal display ("AMLCD") devices, which include thin film transistors as switching devices for a plurality of pixels, have been widely used due to their high resolution and ability to display fast moving images.

FIG. 1 is a three-dimensional view of part of an LCD device according to the related art and illustrates an active area where liquid crystal molecules are driven. In FIG. 1, the LCD device 1 includes upper and lower substrates 60 and 10 spaced apart from and facing each other and a liquid crystal layer 80 interposed between the upper substrate 60 and the lower substrate 10. A plurality of gate lines 8 and a plurality of data lines 20 are formed on an inner surface of the lower substrate 60. The gate lines 8 and the data lines 20 cross each other to define pixel regions, each of which serves as a sub-pixel SP. A thin film transistor ("TFT") T is formed as a switching element at each crossing of the gate lines 8 and the data lines 20. A pixel electrode 30, which is connected to the thin film transistor T, is formed in each sub-pixel SP.

A color filter layer 70 and a common electrode 75 are sequentially formed on an inner surface of the upper substrate 60 facing the lower substrate 10. The color filter layer 70 includes red, green and blue color filter patterns, which correspond to the sub-pixels SP, respectively, and are sequentially arranged. Although not shown in the figure, a black matrix is formed between adjacent color filter patterns to block light in a region where an arrangement of liquid crystal molecules of the liquid crystal layer 80 are not controlled.

FIG. 2 is a schematic plan view of an LCD device according to the related art. In FIG. 2, gate lines, data lines and a color filter layer are schematically illustrated, and a black matrix and thin film transistors are not shown. As illustrated in FIG. 2, in the LCD device 1, gate lines 8 and data lines 20 cross each other to define pixel regions, each of which acts as a sub-pixel SP. Red, green and blue color filter patterns R, G and B are sequentially and repeatedly arranged. The red, green and blue color filter patterns R, G and B correspond to the sub-pixels SP, respectively. The red, green and blue sub-pixels RSP, GSP and BSP constitute a pixel P. However, in the LCD device 1 having three sub-pixels RSP, GSP and BSP as the pixel P, light emitted from a backlight, which is disposed at a rear side of a lower substrate including the gate and data lines 8 and 20 thereon, transmits the red, green and blue color filter patterns R, G and B to thereby produce color images. Thus, brightness of the LCD device is lowered.

To improve the brightness, another LCD device having four sub-pixels of red, green, blue and white as one pixel may be used. A white sub-pixel includes a colorless, transparent pattern. Hereinafter, the colorless, transparent pattern may be referred to as a white color filter pattern. FIG. 3 is a schematic plan view of an LCD device having four color filter patterns according to the related art. As in FIG. 2, a black matrix and thin film transistors are not shown.

As illustrated in FIG. 3, the LCD device 85 includes red, green, blue and white color filter patterns. The red, green, blue and white color filter patterns are formed in sub-pixels SP, respectively, and red, green, blue and white sub-pixels RSP, GSP, BSP and WSP constitute a pixel P. In one embodiment, the red, green, blue and white sub-pixels RSP, GSP, BSP and WSP have a rectangular shape and are similar in size. In an alternate embodiment, the sub-pixels may have a different shape or may differ in size. In the LCD device 85 having the red, green, blue and white color filter patterns, substantially all of light passing through the white sub-pixel WSP is transmitted from the backlight through the white color filter pattern W, and the brightness is thus increased. However, since the white sub-pixel WSP is 25% of the pixel P, the sizes of the red, green and blue sub-pixels RSP, GSP and BSP in the active area are decreased. In other words, the area that the white sub-pixel WSP is covering on the pixel P is less area available for each of the other sub-pixels, RSP, GSP and BSP. Therefore, although the brightness is increased, color purity is lowered. In addition, the difference of a contrast ratio between a gray level and a white level is deteriorated due to the increased white brightness, and thus image qualities are decreased.

SUMMARY

Accordingly, the present embodiments are directed to a liquid crystal display device that substantially obviates one or more problems due to limitations and disadvantages of the related art. Additional features and advantages of the embodiments will be set forth in the description which follows, and in part will be apparent from the description, or may be learned by practice of the embodiments. The advantages of the embodiments will be realized and attained by the structure particularly pointed out in the written description and claims hereof as well as the appended drawings.

In a first aspect, an array substrate for a liquid crystal display device includes a substrate, first and second gate lines of a first direction on the substrate, and a common line of the first direction between the first and second gate lines. Also, included are first and second data lines of a second direction that cross the first and second gate lines and the common line. The crossing defines a pixel. The pixel includes first, second, third and fourth sub-pixels. The fourth sub-pixel is smaller than the first, second and third sub-pixels. A thin film transistor is located at a crossing point of the first and second gate lines and the first and second data lines, and a common electrode is located in the first, second, third and fourth sub-pixels and connected to the common line. Pixel electrodes in the first, second, third and fourth sub-pixels are connected to the thin film transistor.

In a second aspect an array substrate for a liquid crystal display device includes a substrate, first and second gate lines of a first direction on the substrate, and first and second data lines of a second direction. The first and second data lines cross the first and second gate lines to define a pixel. The pixel includes first, second, third and fourth sub-pixels, wherein the fourth sub-pixel is smaller than the first, second and third sub-pixels. A thin film transistor is located at each crossing point of the first and second gate lines and the first and second data lines. A pixel electrode in the first, second, third and fourth sub-pixels is connected to the thin film transistor.

In a third aspect, a color filter substrate for a liquid crystal display device includes a substrate, a black matrix on the substrate, and filter patterns on the substrates. The filter patterns are red, green, blue and white. The white color filter pattern is smaller than the red, green and blue color filter patterns.

In fourth aspect, a liquid crystal display device includes first and second substrates. A pixel on the substrates includes first, second, third and fourth sub-pixels. A liquid crystal layer is between the first and second substrates. The fourth sub-pixel is smaller than the first, second and third sub-pixels.

It is to be understood that both the foregoing general description and the following detailed description are exemplary and explanatory and are intended to provide further explanation of the disclosure as claimed.

BRIEF DESCRIPTION OF THE DRAWINGS

The accompanying drawings, which are included to provide a further understanding of the embodiments and are incorporated in and constitute a part of this specification, illustrate embodiments of the disclosure and together with the description serve to explain the principles of the disclosure. In the drawings.

DETAILED DESCRIPTION OF THE EMBODIMENTS

Reference will now be made in detail to the embodiments of the present disclosure, examples of which are illustrated in the accompanying drawings.

Figure 1:
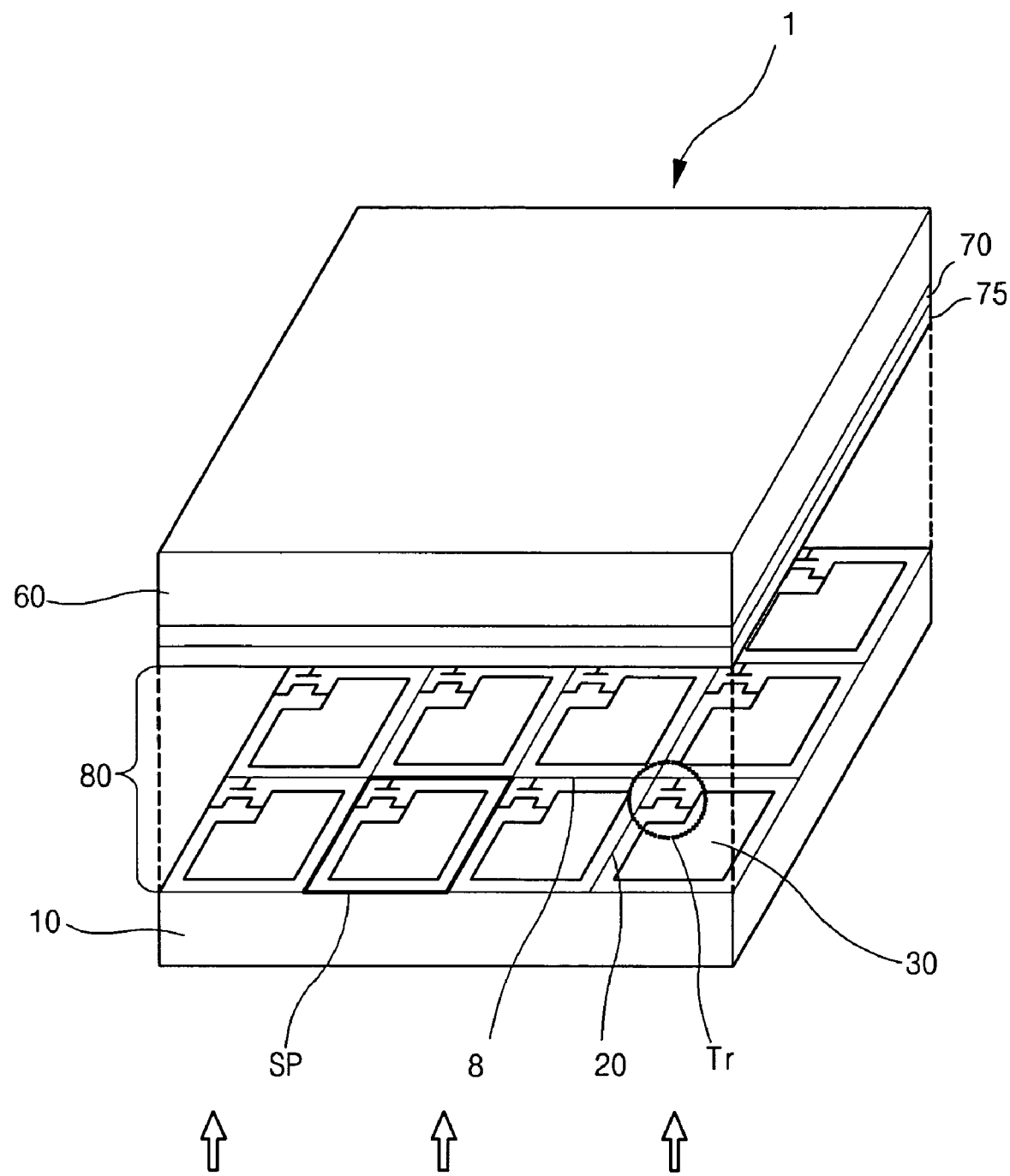
FIG. 1 is a three-dimensional view of part of an LCD device according to related art.
Figure 2:
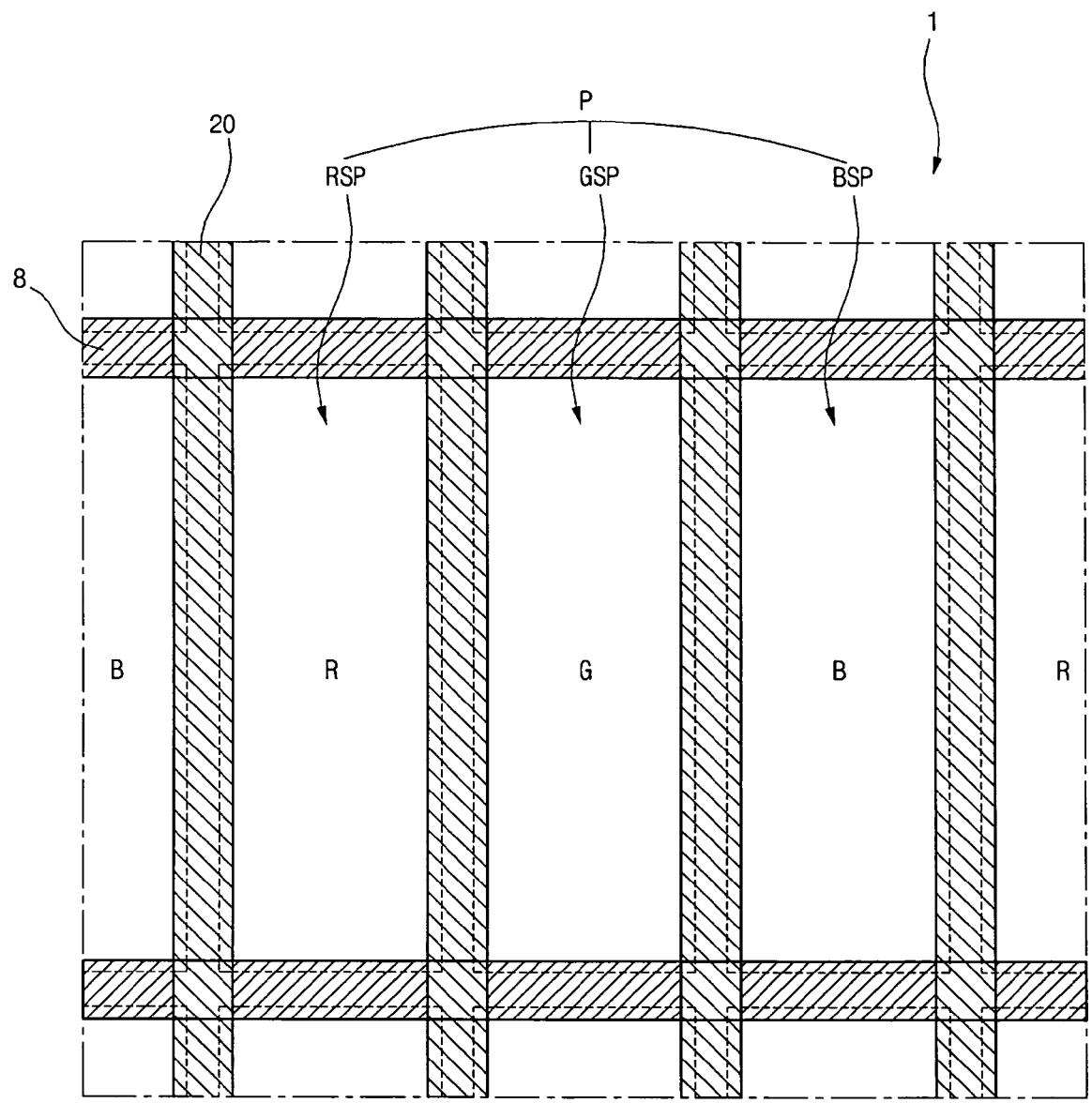
FIG. 2 is a schematic plan view of an LCD device according to the related art.
Figure 3:
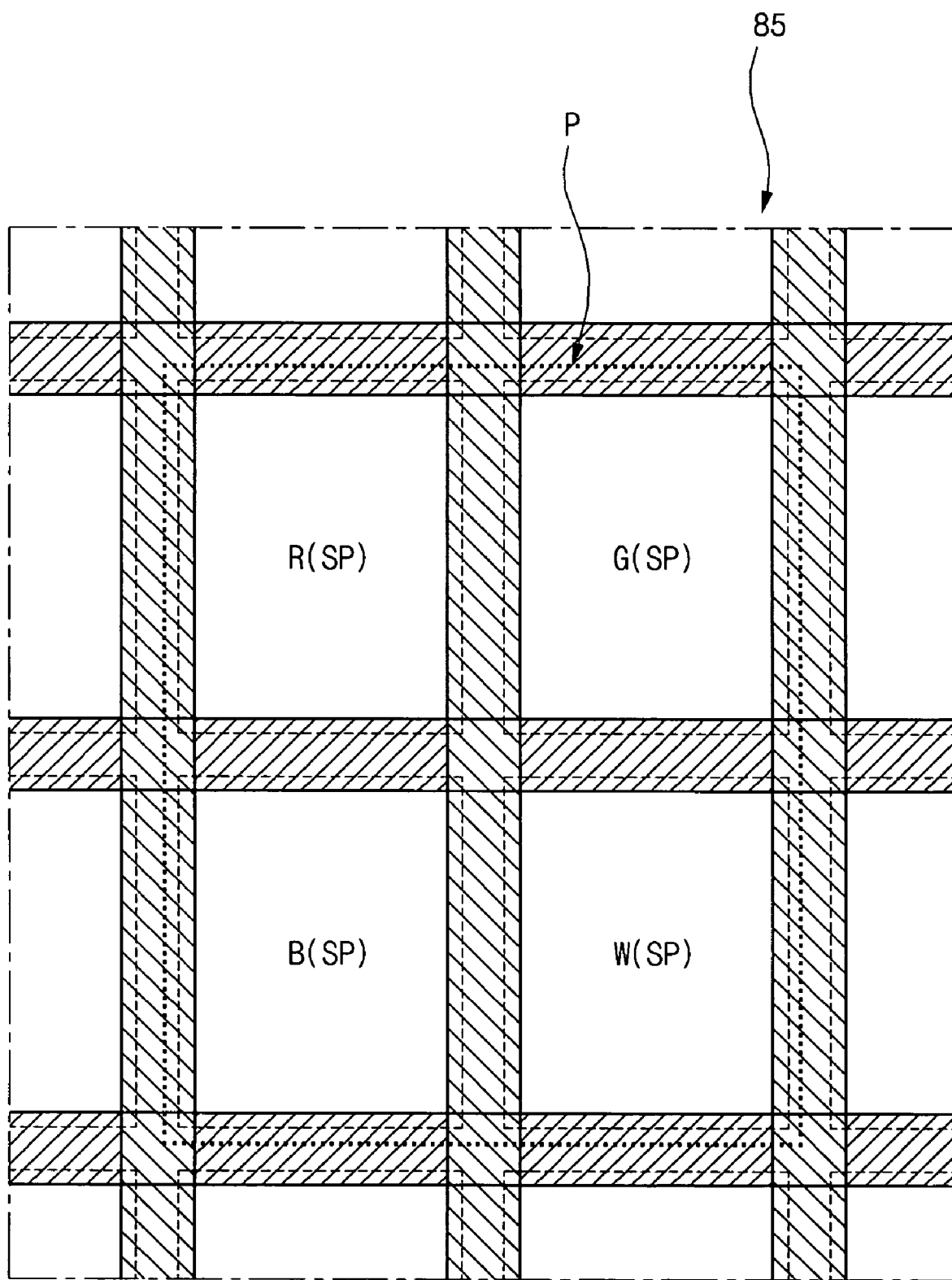
FIG. 3 is a schematic plan view of an LCD device having four color filter patterns according to the related art.
Figure 4:
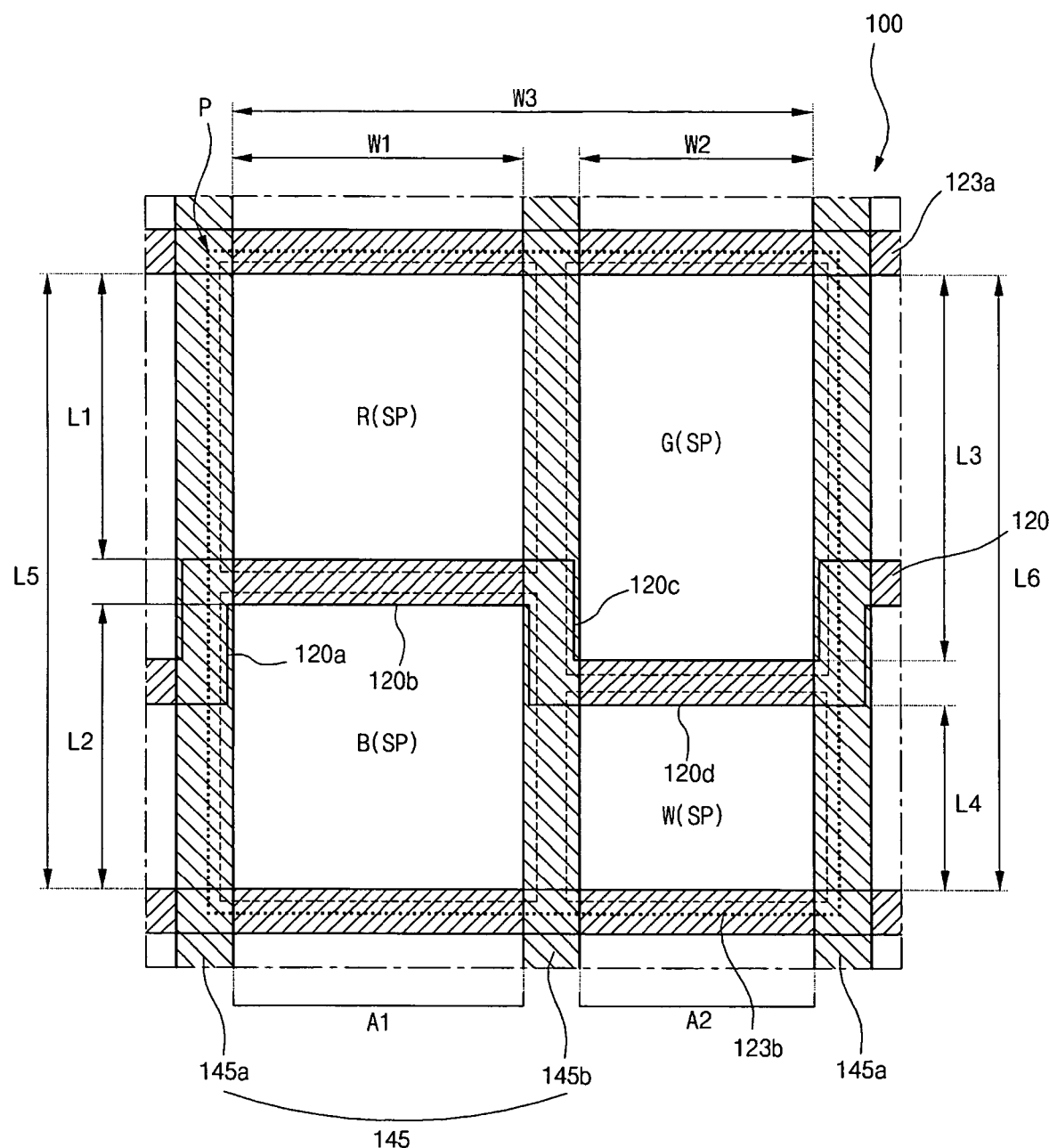
FIG. 4 is a schematic plan view of an LCD device according to an embodiment.

FIG. 4 is a schematic plan view of a liquid crystal display (LCD) device according to an embodiment. In FIG. 4, lines and color filter patterns are schematically illustrated, and a black matrix and thin film transistors are not shown. As shown in FIG. 4, in the LCD device 100, first and second gate lines 123a and 123b are formed in a first direction, and first and second data lines 145a and 145b are formed in a second direction. A common line 120 is extended along the first direction and is disposed between the first and second gate lines 123a and 123b. The first and second gate lines 123a and 123b and the common line 120 cross the first and second data lines 145a and 145b to define pixel regions, which serve as sub-pixels SP. Red, green, blue and white color filter patterns R, G, B and W are formed in the sub-pixels SP, respectively. The red, green, blue and white sub-pixels RSP, GSP, BSP and WSP constitute a pixel P. In one embodiment, the red and green sub-pixels RSP and GSP are close by each other along the first direction, the blue and white sub-pixels BSP and WSP are adjacent to each other along the first direction, the red and blue sub-pixels RSP and BSP are close by each other along the second direction, and the green and white sub-pixels GSP are adjacent to each other along the second direction. In alternate embodiments, the sub-pixels may be arranged differently.

The common line 120 may include first, second, third and fourth parts 120a, 120b, 120c and 120d. In one embodiment, the first and third parts 120a and 120c are parallel to the first and second data lines 145a and 145b and overlap the first and second data lines 145a and 145b, respectively. The second and fourth parts 120b and 120d may be parallel to the first and second gate lines 123a and 123b and are not disposed in a line. The second part 120b is disposed between the red sub-pixel RSP and the blue sub-pixel BSP, and the fourth part 120d is disposed between the green sub-pixel GSP and the white sub-pixel WSP.

In one embodiment, the red, green and blue sub-pixels RSP, GSP and BSP have substantially the same size, and the white sub-pixel WSP has a smaller size than the red, green and blue sub-pixels. Therefore, the size of the white sub-pixel WSP is smaller than 25% of that of the pixel P as in the related art from FIG. 4. In alternate embodiments, the arrangement of the sub-pixels may be changed. Specifically, the pixel P is divided into a first area A1 and a second area A2 that adjoin each other along the first direction. The first area A1 includes the red and blue sub-pixels RSP and BSP, and the second area A2 includes the green and white sub-pixels GSP and WSP.

The first area A1 has a first width W1, and the second area A2 has a second width W2. The first and second widths W1 and W2 are defined as distances between the first and second data lines 145a and 145b. Accordingly, the red and blue sub-pixels RSP and BSP have the first width W1, and the green and white sub-pixels GSP and WSP have the second width W2. The pixel P has a third width W3, which is larger than the sum of the first and second widths W1 and W2.

The red sub-pixel RSP has a first length L1, the blue sub-pixel BSP has a second length L2, the green sub-pixel GSP has a third length L3, and the white sub-pixel WSP has a fourth length L4. The first area A1 has a fifth length L5, and the second area A2 has a sixth length L6. The fifth length L5 and the sixth length L6 substantially correspond to a length of the pixel P. The first length L1 is defined as a distance between the first gate line 123a and the second part 120b of the common line 120. The second length L2 is defined as a distance between the second part 120b and the second gate line 123b. The third length L3 is defined as a distance between the first gate line 123a and the fourth part 120d of the common line 120. The fourth length L4 is defined as a distance between the fourth part 120d and the second gate line 123b. The fifth length L5 and the sixth length L6 are defined as a distance between the first and second gate lines 123a and 123b. The fifth length L5 is longer than the sum of the first and second lengths L1 and L2, and the sixth length L6 is longer than the sum of the third and fourth lengths L3 and L4. The fifth length L5 equals to the sixth length L6. The pixel P has the same length as the fifth and sixth lengths L5 and L6. The first length L1 equals to the second length L2, and the third length L3 is longer than the fourth length L4. Thus, the third length L3 is longer than the first and second lengths L1 and L2, and the fourth length L4 is shorter than the first and second lengths L1 and L2. That is, L4<L1=L2<L3. The lengths and widths described above are according to one embodiment, specifically as shown in FIG. 4. In alternate embodiments, the ratio of the lengths and widths may vary and the arrangement of the sub-pixels may likewise vary.

As stated above, in one embodiment, the red, green and blue sub-pixels RSP, GSP and BSP have substantially the same size, and the first width W1 is wider than the second width W2 because the third length L3 of the green sub-pixel GSP is longer than the first and second lengths L1 and L2 of the red and blue sub-pixels RSP and BSP. The size of the white sub-pixel WSP may be changed by controlling the lengths L1, L2, L3 and L4 and the widths W1 and W2. In other words, each of the sub-pixels may be resized by changing the lengths and widths and the change of one of the sub-pixels may affect at least one of the other sub-pixels.

Figure 5:
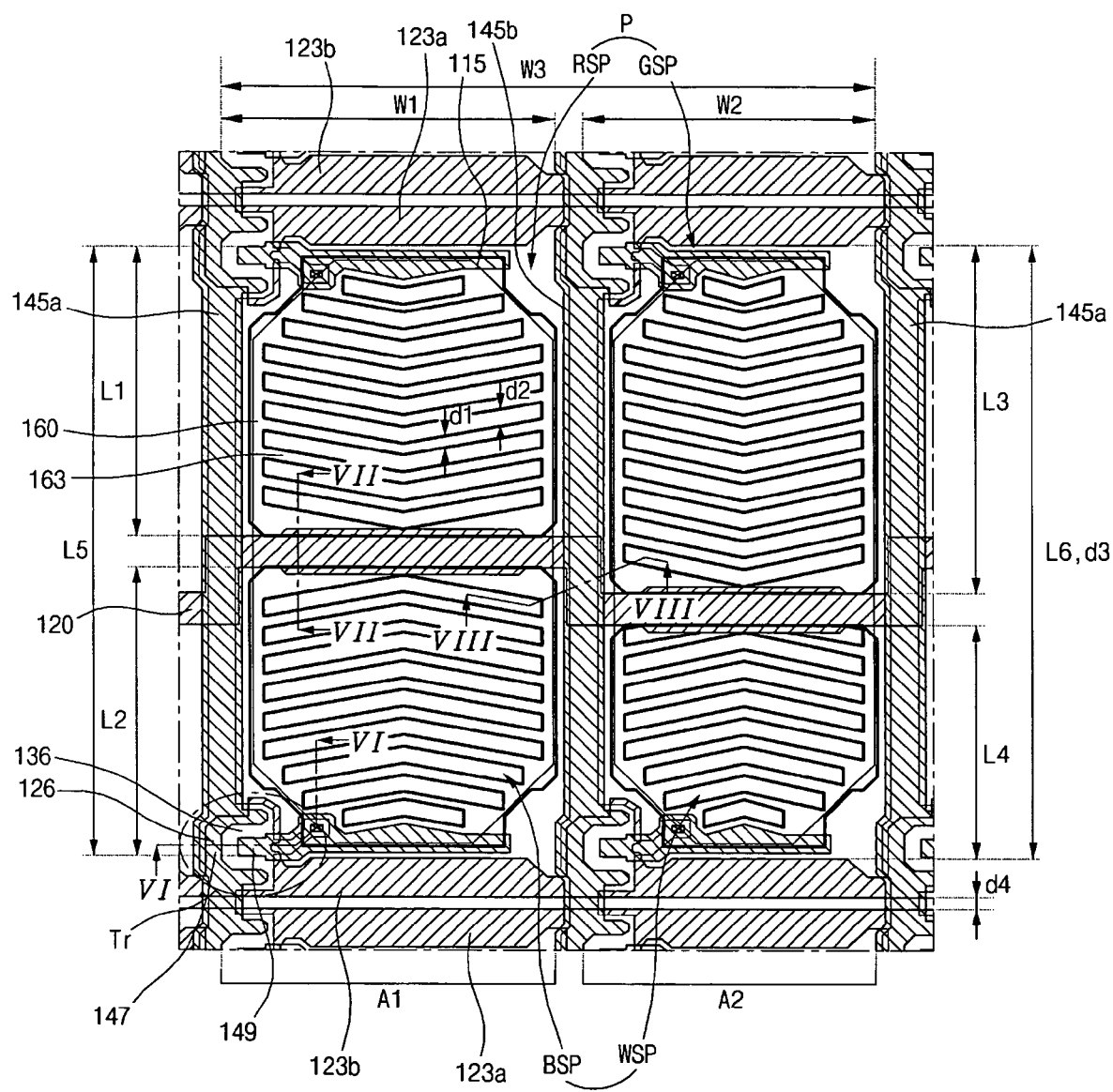
FIG. 5 is a plan view of an array substrate for an LCD device according to an embodiment.

FIG. 5 is a plan view of an array substrate for an LCD device according to an embodiment. Common and pixel electrodes are formed on the same substrate, and liquid crystal molecules are driven by an electric field parallel with the substrate to thereby improve viewing angles. In a conventional in-plane switching (IPS) LCD device including common and pixel electrodes on the same substrate, the common and pixel electrodes are parallel to a data line and are alternately arranged. By controlling the distance between the common and pixel electrodes, an electric field is induced between the common and pixel electrodes, and liquid crystal molecules are driven by the electric field. Additionally, when sizes of sub-pixels are changed like with the present embodiments, widths of the common and pixel electrodes and distances between the common and pixel electrodes may also be changed. As the width of the sub-pixel becomes more narrow, the distances between the common and pixel electrodes may also be narrowed. In this case, the distances may not be balanced, and image qualities are lowered.

The array substrate of FIG. 5 may be one embodiment for improving image quality. In the array substrate according to an embodiment, pixel electrodes 163 are formed in each of first, second, third and fourth sub-pixels RSP, BSP, GSP and WSP. The pixel electrodes 163 are spaced apart from each other and substantially parallel to gate lines 123a and 123b. In one embodiment, common electrodes 115 are formed in a first area A1 including the first and second sub-pixels RSP and BSP and a second area A2 including the third and fourth sub-pixels GSP and WSP, respectively. One of the common electrodes 115 overlaps the pixel electrodes 163 of the first and second sub-pixels RSP and BSP, and the other of the common electrodes 115 overlaps the pixel electrodes 163 of the third and fourth sub-pixels GSP and WSP. Even though sizes of the sub-pixels are changed according to changes in widths and lengths of the sub-pixels, only distances d1 of the pixel electrodes and distances d2 between adjacent pixel electrodes are considered so that the sub-pixels RSP, GSP, BSP and WSP have substantially the same image qualities. Thus, degrees of freedom in designing the array substrate are considerably increased.

The structure of the array substrate of FIG. 5 will now be described in more detail. As shown in FIG. 5, the first and second gate lines 123a and 123b are formed in a first direction, and first and second data lines 145a and 145b are formed in a second direction. A common line 120 is extended along a first direction and is disposed between the first and second gate lines 123a and 123b. The first and second data lines 145a and 145b cross the first and second gate lines 123a and 123b and the common line 120 to define the first, second, third and fourth sub-pixels RSP, BSP, GSP and WSP. In one embodiment, a portion of the common line 120 is indented toward the second gate line 123b in the second area A2, and thus the fourth sub-pixel WSP has a smaller size than the first, second and third sub-pixels RSP, BSP and GSP. The first, second, third and fourth sub-pixels RSP, BSP, GSP and WSP may correspond to red, green, blue and white color filter patterns (not shown), which are formed on a color filter substrate facing the array substrate. The first, second, third and fourth sub-pixels RSP, BSP, GSP and WSP constitute a pixel P. In one embodiment, the pixel P is divided into the first and second areas A1 and A2 adjacent to each other along a first direction. As stated above, in one embodiment, the first area A1 includes the first and second sub-pixels RSP and BSP, and the second area A2 includes the third and fourth sub-pixels GSP and WSP.

The first and second gate lines 123a and 123b in the pixel P have a distances d3 therebeteween, and the second gate line 123b in the pixel P and a first gate line 123a in a next pixel P along the second direction have a distance d4 therebetween, wherein the distance d4 is much smaller than the distance d3. The first and second data lines 145a and 145b in the pixel P have a first width W1 therebetween, and the second data line 145b in the pixel P and the first data line 145b in a next pixel P along the first direction have a second width W2 therebetween.

Thin film transistors Tr are formed at crossing points of the first and second gate lines 123a and 123b and the first and second data lines 145a and 145b. Each thin film transistor Tr includes a gate electrode 126, an active layer 136, a source electrode 147 and a drain electrode 149. In each of the first, second, third and fourth sub-pixels RSP, BSP, GSP and WSP, the pixel electrodes 163 are formed. The pixel electrodes 163 are formed in the first direction and are connected to each other through an auxiliary pixel electrode connecting line 160. The auxiliary pixel electrode connecting line 160 has a closed curve shape corresponding to a peripheral portion of each of the first, second, third and fourth sub-pixels RSP, BSP, GSP and WSP. Both ends of each of the pixel electrodes 163 are connected to the auxiliary pixel electrode connecting line 160. The pixel electrodes 163 may be parallel to the first and second gate lines 123a and 123b. To form multi-domains in each sub-pixel, the pixel electrodes 163 may be bent to have an obtuse angle and may have a symmetric structure.

The common electrodes 115 are formed in the first area A1 and the second area A2, respectively. The common electrode 115 in the first area A1 overlaps the pixel electrodes 163 in the first and second sub-pixels RSP and BSP, and the common electrode 115 in the second area A2 overlaps the pixel electrodes 163 in the third and fourth sub-pixels GSP and WSP. The pixel electrodes 163, the auxiliary pixel electrode connecting lines 160, and the common electrodes 115 are formed of a transparent conductive material. The first area A1 has the first width W1, and the second area A2 has the second width W2. Accordingly, the first and second sub-pixels RSP and BSP have the first width W1, and the third and fourth sub-pixels GSP and WSP have the second width W2. The pixel has a third width W3, which is larger than the sum of the first and second widths W1 and W2 in one embodiment.

The first sub-pixel RSP has a first length L1, the second sub-pixel BSP has a second length L2, the third sub-pixel GSP has a third length L3, and the fourth sub-pixel WSP has a fourth length L4. The first area A1 has a fifth length L5, and the second area A2 has a sixth length L6. The fifth length L5 and the sixth length L6 substantially correspond to a length of the pixel P. The fifth length L5 is longer than the sum of the first and second lengths L1 and L2, and the sixth length L6 is longer than the sum of the third and fourth lengths L3 and L4. The fifth length L5 equals to the sixth length L6. The first length L1 equals to the second length L2, and the third length L3 is longer than the fourth length L4.

In the array substrate according to one embodiment, the fourth sub-pixel WSP is smaller than the first, second and third sub-pixels RSP, BSP and GSP. The first, second and third sub-pixels RSP, BSP and GSP have substantially the same size. Thus, the third length L3 is longer than the first and second lengths L1 and L2, and the fourth length L4 is shorter than the first and second lengths L1 and L2. In addition, the first width W1 is wider than the second width W2. In alternate embodiments, the ratios of the lengths and widths may be different.

Figure 6:
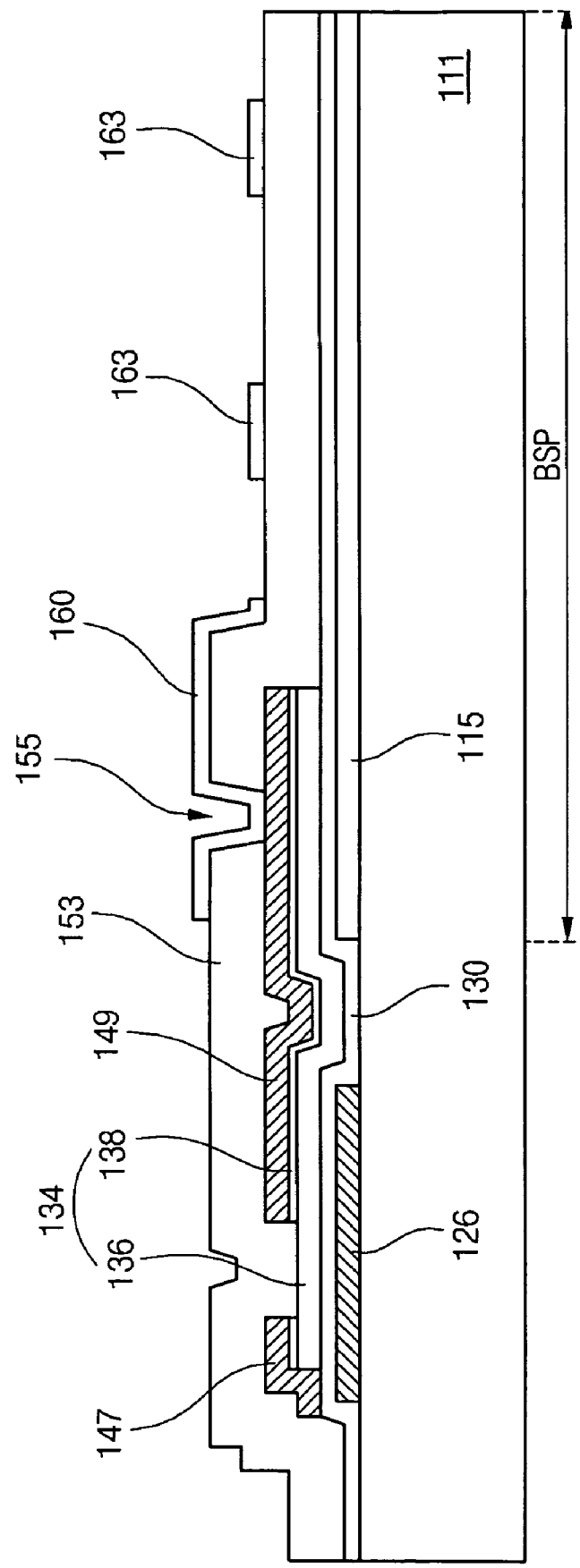
FIG. 6, FIG. 7 and FIG. 8 are cross-sectional views along the lines VI-VI, VII-VII and VIII-VIII of FIG. 5, respectively.
Figure 7:
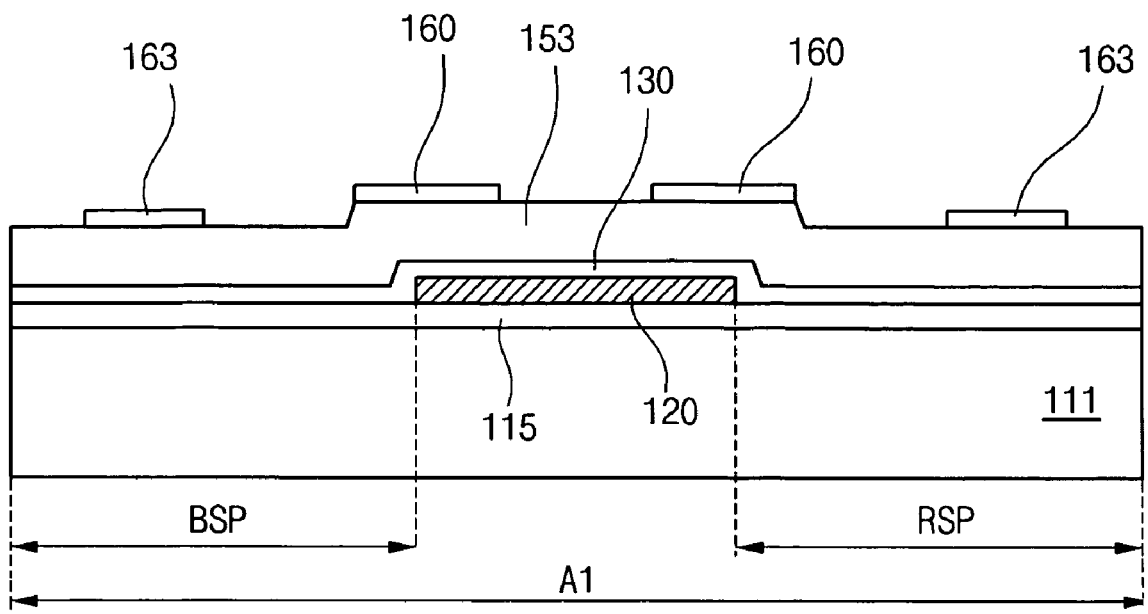
Figure 8:
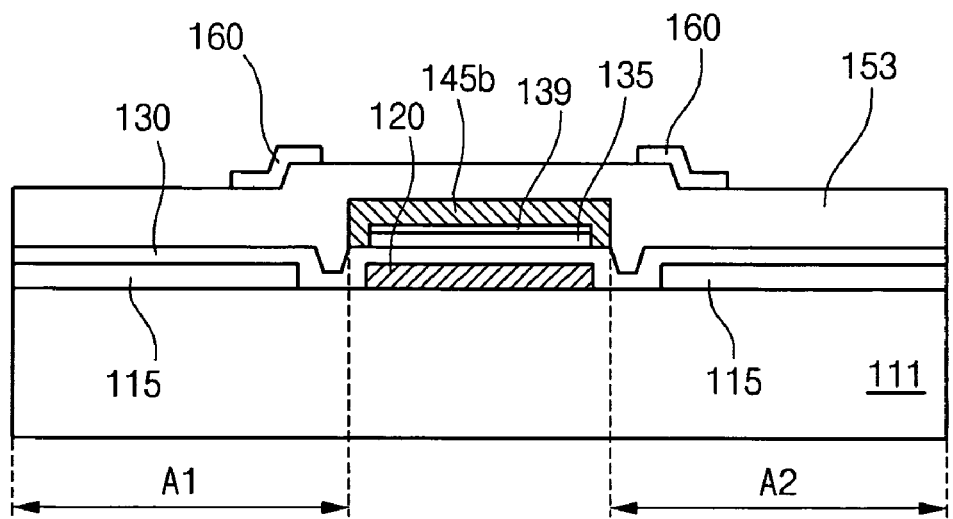

FIG. 6, FIG. 7 and FIG. 8 are cross-sectional views along the lines VI-VI, VII-VII and VIII-VIII of FIG. 5, respectively. For the convenience of explanation, a left area is defined as a first area A1 with respect to a data line in a pixel, that is, the second data line of FIG. 5, and a right area is defined as a second area A2 in the context of the figures. As shown in the figures, a common electrode 115 is formed on a transparent substrate 111 in each of the first and second areas A1 and A2. The common electrode 115 has a plate shape. The common electrode 115 is formed of a transparent conductive material such as indium tin oxide and indium zinc oxide. A gate electrode 126 and a common line 120 are formed on the substrate 111 including the common electrode 115. The gate electrode 126 and the common line 120 may be formed of a metallic material. The common line 120 is disposed on and contacts the common electrode 115. First and second sub-pixels RSP and BSP are defined in both sides of the first area A1 with respect to the common line 120. Third and fourth sub-pixels (not shown) are also defined in both sides of the second area A2 with respect to the common line 120. In one embodiment, first and second gate lines (not shown) are formed of the same material and on the same layer as the gate electrode 126 and the common line 120. The first and second gate lines are formed in the same direction as the common line 120, and the common line 120 is disposed between the first and second gate lines. The common line 120 electrically separates from the first and second gate lines. The gate electrode 126 is connected to each of the first and second gate lines.

A gate insulating layer 130 is formed on substantially an entire surface of the substrate 100 including the gate electrode 126 and the common line 120 thereon. An active layer 136 of intrinsic amorphous silicon is formed on the gate insulating layer 130 over the gate electrode 126, and an ohmic contact layer 138 of impurity-doped amorphous silicon is formed on the active layer 136. The active layer 136 and the ohmic contact layer 138 constitute a semiconductor layer 134. On the other hand, an intrinsic amorphous silicon layer 135 and an impurity-doped amorphous silicon layer 139 may be sequentially formed in a region where first and second data lines are formed. The intrinsic amorphous silicon layer 135 is connected to the active layer 136, and the impurity-doped amorphous silicon layer 139 is connected to the ohmic contact layer 138. The intrinsic amorphous silicon layer 135 and the impurity-doped amorphous silicon layer 139 partially overlap the common line 120. The intrinsic amorphous silicon layer 135 and the impurity-doped amorphous silicon layer 139 may be omitted.

A source electrode 147 and a drain electrode 149 are formed on the substrate 111 including the active layer 136, the ohmic contact layer 138, the intrinsic amorphous silicon layer 135, and the impurity-doped amorphous silicon layer 139 thereon. The source and drain electrodes 147 and 149 are spaced apart from each other over the gate electrode 126. A first data line 145a of FIG. 5 and a second data line 145b are also formed. A part of each of the first and second data lines 145a and 145b functions as the source electrode 147. As stated above, the first and second data lines 145a and 145b are disposed on the impurity-doped amorphous silicon layer 139, and thus partially overlap the common line 120.

A passivation layer 153 is formed on substantially an entire surface of the substrate 111 including the first and second data lines 145a and 145b, the source electrode 147, and the drain electrode 149 thereon. The passivation layer 153 has a drain contact hole 155 partially exposing the drain electrode 149. An auxiliary pixel electrode connecting line 160 and pixel electrodes 163 are formed on the passivation layer 153 in each of the sub-pixels RSP and BSP. The auxiliary pixel electrode connecting line 160 is connected to the drain electrode 149 through the drain contact hole 155. The auxiliary pixel electrode connecting line 160 overlaps the common line 120. The pixel electrodes 163 are connected to the auxiliary pixel electrode connecting line 160 and thus are electrically connected to the drain electrode 149. The pixel electrodes 163 are spaced apart from each other and overlap the common electrode 115. The pixel electrodes 163 and the auxiliary pixel electrode 160 are formed of a transparent conductive material such as indium tin oxide and indium zinc oxide.

The array substrate illustrated in FIGS. 5, 6, 7 and 8 may be attached to a color filter substrate, which includes red, green, blue and white color filter patterns. A liquid crystal material is interposed between the attached array substrate and color filter substrate to thereby form an LCD device according to one embodiment. The red, blue, green and white color filter patterns correspond to the first, second, third and fourth sub-pixels RSP, BSP, GSP and WSP of FIGS. 5, 6, 7 and 8, respectively. In one embodiment, the white color filter pattern is smaller than the red, green and blue color filter patterns, and the red, green and blue color filter patterns have substantially the same size. In the LCD device according to one embodiment, since the white sub-pixel is smaller than the red, green and blue sub-pixels, the brightness of the LCD device is increased, and color purities are also increased as compared with the related art LCD device having a pixel of the same size. Accordingly, image quality may be improved.

Moreover, the liquid crystal molecules are driven by an electric field parallel to the substrates, and thus viewing angles are improved. In addition, the common and pixel electrodes are formed of a transparent conductive material, and the brightness may be increased. Furthermore, because the common electrode has a plate shape, degrees of freedom in designing the LCD device are increased.

Figure 9:
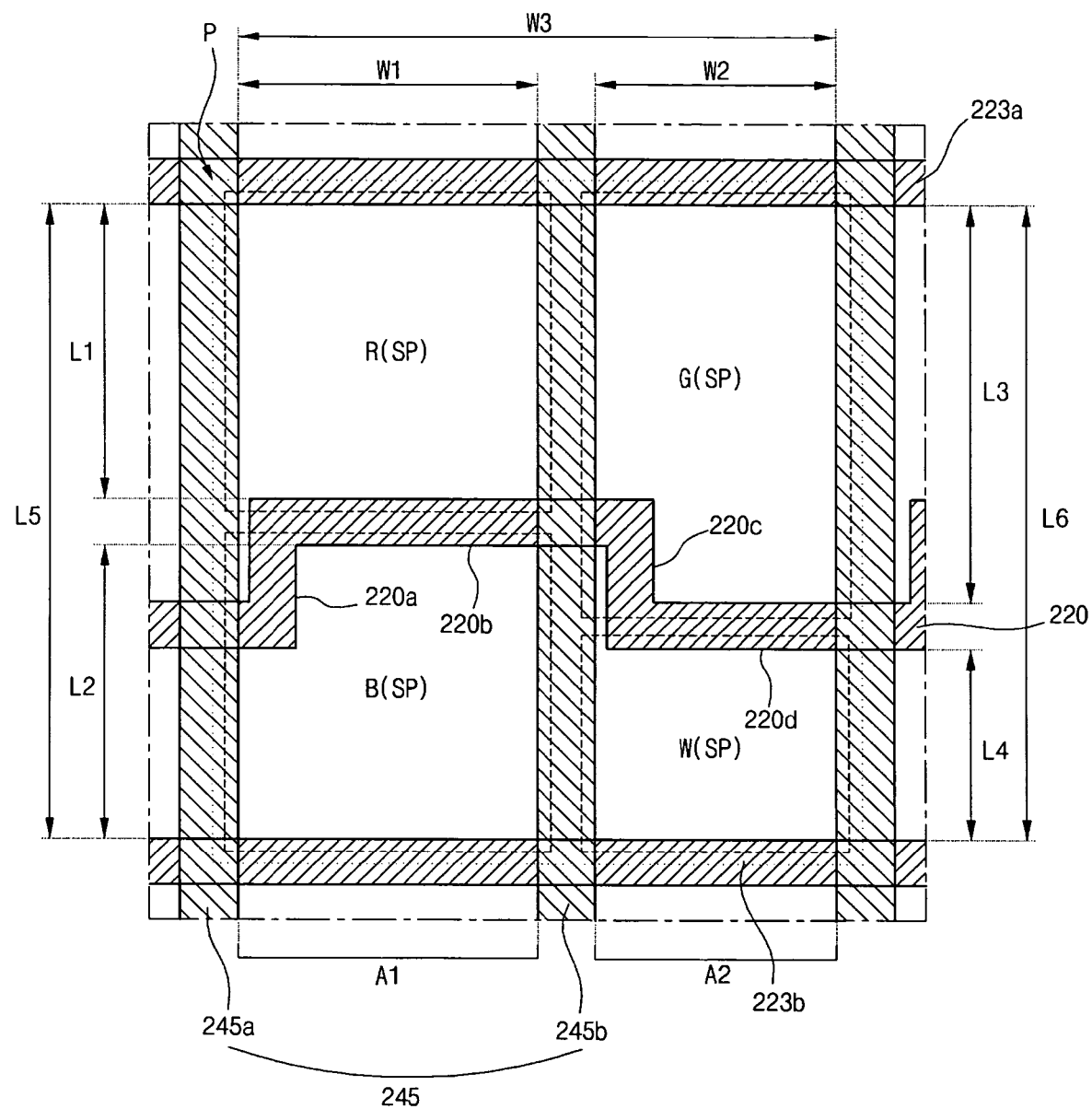
FIGS. 9, 10 and 11 are views illustrating other examples according to an embodiment.
Figure 10:
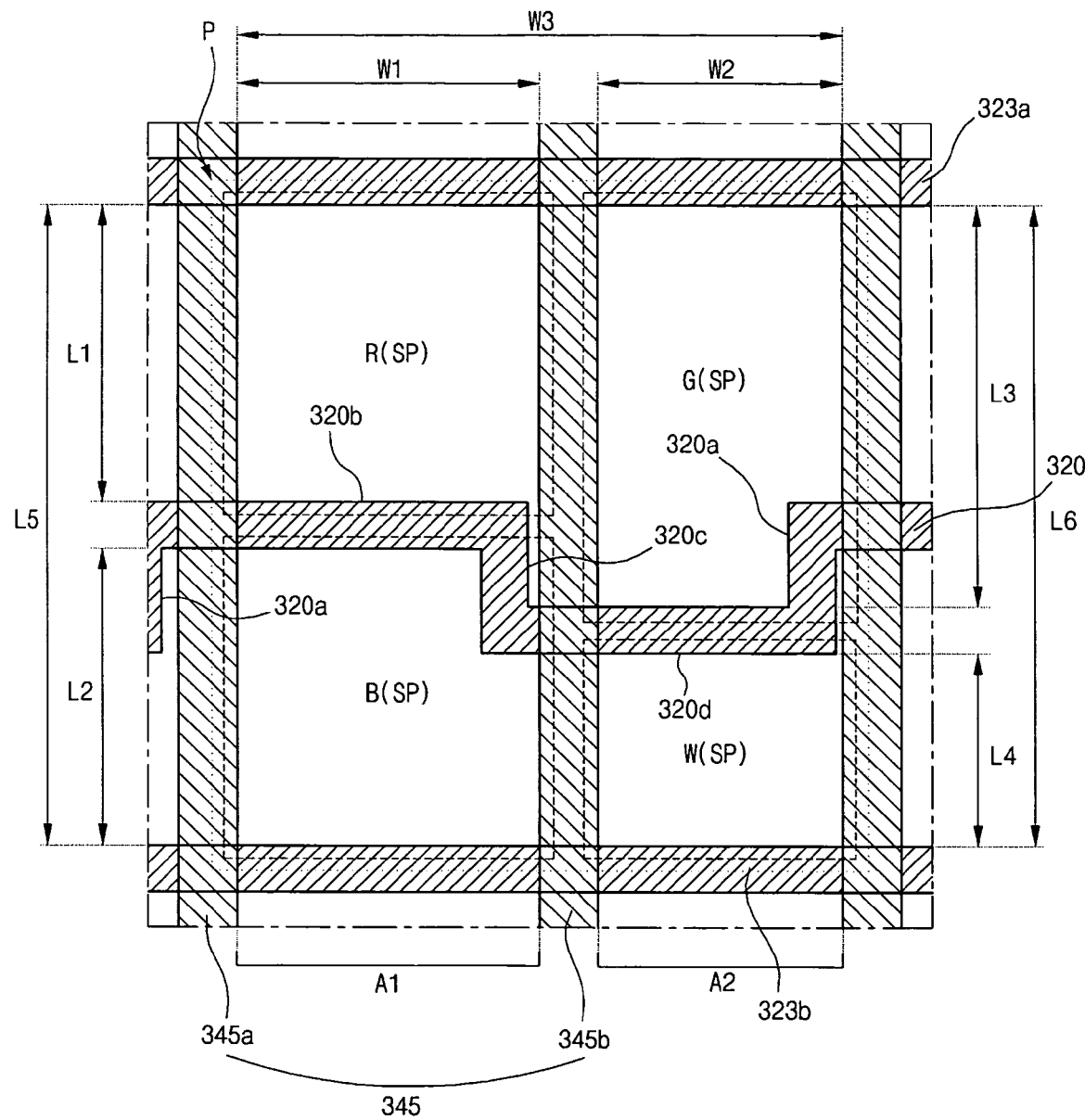
Figure 11:
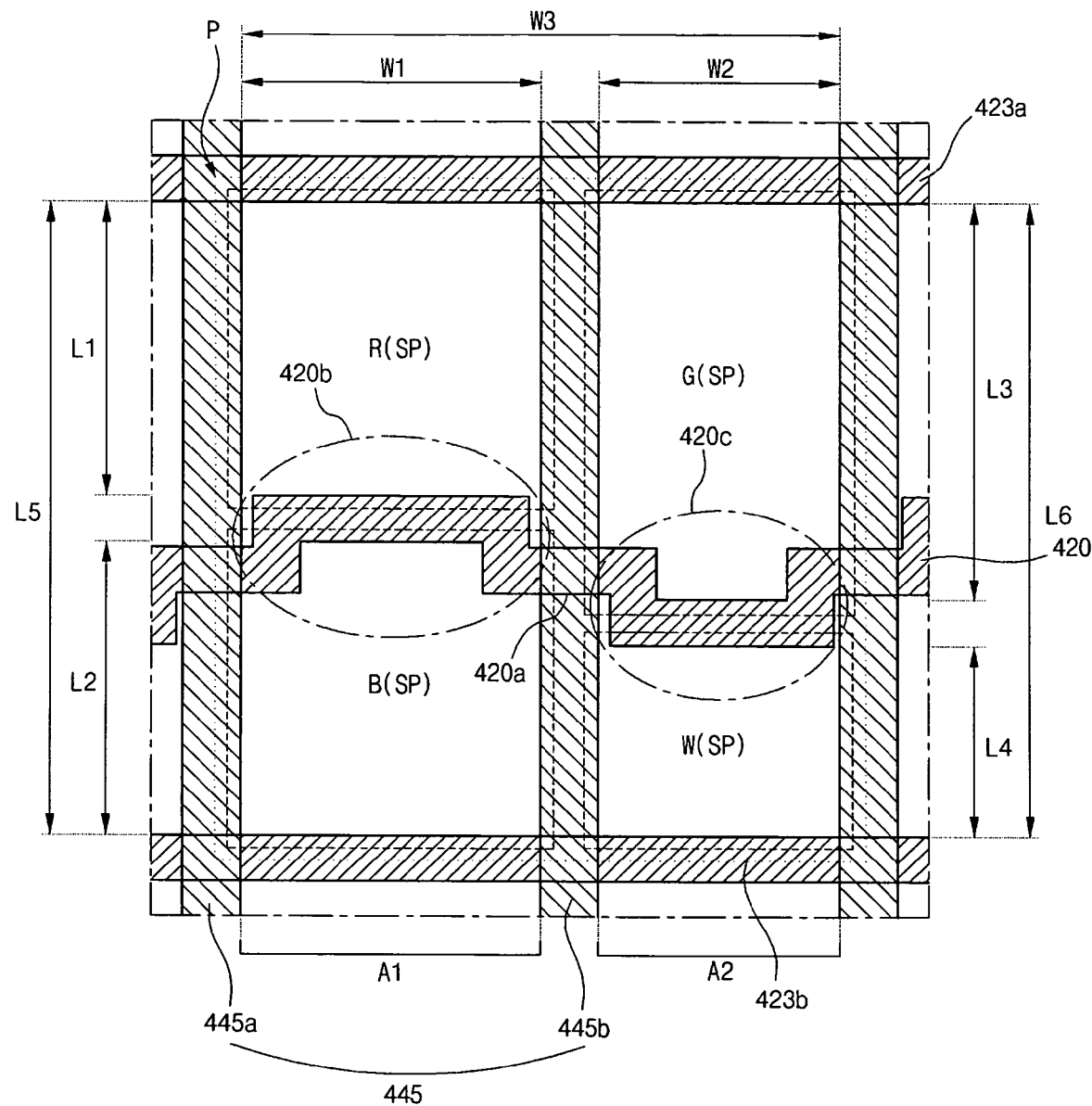

FIGS. 9, 10 and 11 are views illustrating other examples according to an embodiment. Here, the structure of the common line is varied, and other parts have substantially the same structures as parts in FIGS. 4 and 5. Accordingly, the explanation for the same parts may be omitted.

In FIG. 9, a common line 220 is formed in the same direction as first and second gate lines 223a and 223b. The common line 220 includes first, second, third and fourth parts 220a, 220b, 220c and 220d. The first, second, third and fourth parts 220a, 220b, 220c and 220d are sequentially connected to each other. In one embodiment, the first part 220a and the third part 220c are parallel to first and second data lines 245a and 245b, and the second part 220b and the fourth part 220d are parallel to the first and second gate lines 223a and 223b. The first part 220a is disposed in a first area A1, and the third part 220c is disposed in a second area A2. The second part 220b is disposed substantially in the first area A1 and crosses the second data line 245b. The fourth part 220d is disposed substantially in the second area A2 and crosses the first data line 245a. The second and fourth parts 220b and 220d are not disposed on a line. The first area A1 is divided into first and second sub-pixels RSP and BSP by the second part 220b, and the second area A2 is divided into third and fourth sub-pixels GSP and WSP by the fourth part 220d. The first, second and third sub-pixels RSP, BSP and GSP have substantially the same size, and the fourth sub-pixel WSP has a smaller size than the first, second and third sub-pixels RSP, BSP and GSP according to one embodiment.

In FIG. 10, a common line 320 is formed in the same direction as first and second gate lines 323a and 323b. The common line 320 includes first, second, third and fourth parts 320a, 320b, 320c and 320d. The first, second, third and fourth parts 320a, 320b, 320c and 320d are sequentially connected to each other. The first part 320a and the third part 320c are parallel to first and second data lines 345a and 345b, and the second part 320b and the fourth part 320d are parallel to the first and second gate lines 323a and 323b. The first part 320a is disposed in the second area A2, and the third part 320c is disposed in the first area A1. The second part 320b is disposed substantially in the first area A1 and crosses the first data line 245a. The fourth part 320d is disposed substantially in the second area A2 and crosses the second data line 245b. The second and fourth parts 320b and 320d are not disposed on a line. The first area A1 is divided into first and second sub-pixels RSP and BSP by the second part 320b, and the second area A2 is divided into third and fourth sub-pixels GSP and WSP by the fourth part 320d. The first, second and third sub-pixels RSP, BSP and GSP have substantially the same size, and the fourth sub-pixel WSP has a smaller size than the first, second and third sub-pixels RSP, BSP and GSP according to one embodiment.

In FIG. 11, a common line 420 is formed in the same direction as first and second gate lines 423a and 423b. The common line 420 includes first, second and third parts 420a, 420b and 420c. The first part 420a is connected to the second and third parts 420b and 420c. The first part 420a is parallel to the first and second gate lines 423a and 423b and crosses the first and second data lines 445a and 445b. The second part 420b is disposed in the first area A1 and is indented toward the first gate line 423a. The third part 420c is disposed in the second area A2 and is indented toward the second gate line 423b. The first area A1 is divided into first and second sub-pixels RSP and BSP by the second part 420b, and the second area A2 is divided into third and fourth sub-pixels GSP and WSP by the third part 420c. The first, second and third sub-pixels RSP, BSP and GSP have substantially the same size, and the fourth sub-pixel WSP has a smaller size than the first, second and third sub-pixels RSP, BSP and GSP according to one embodiment.

In FIGS. 9, 10 and 11, the parts of the common line parallel to the gate lines cross the data lines, and thus overlapping portions between the common line and the data lines are decreased as compared with the LCD device according to the embodiment shown in FIG. 4. Therefore, parasitic capacitances may be decreased, and signal delays may be improved. Although there is a difference in the sizes between the sub-pixels, the difference is small because the common line has a smaller area than the sub-pixels. Accordingly, the color purities are not particularly affected. Meanwhile, by controlling the size of a black matrix in each sub-pixel, the red, green and blue sub-pixels may have the same size.

Figure 12:
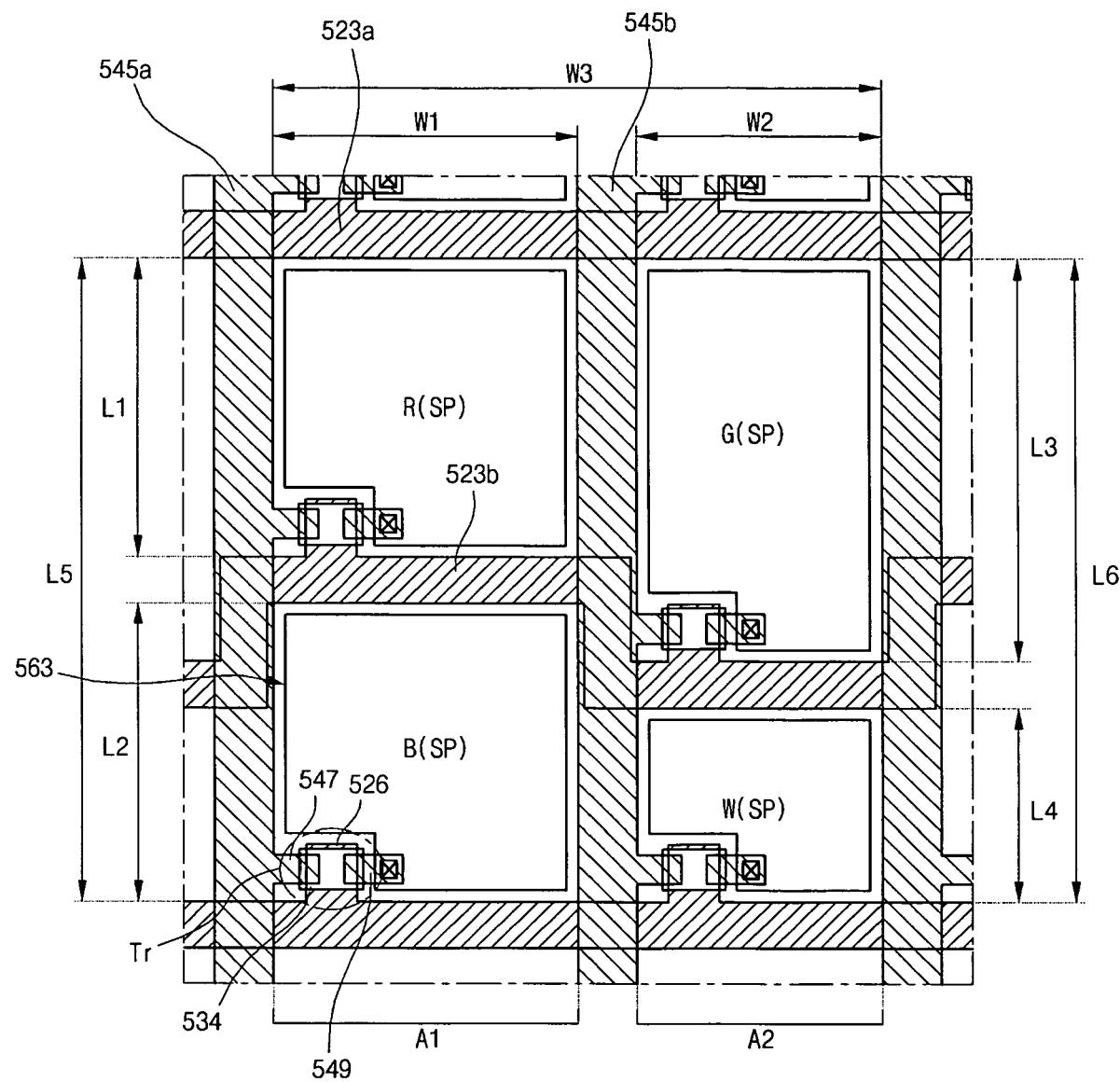
FIG. 12 is a schematic plan view of an array substrate for an LCD device according to an embodiment.

FIG. 12 is a schematic plan view of an array substrate for an LCD device according to an embodiment. In the LCD device of this embodiment, common and pixel electrodes are formed on different substrates. In FIG. 12, first and second gate lines 523a and 523b are formed in a first direction, and first and second data lines 545a and 545b are formed in a second direction. The first and second gate lines 523a and 523b and the first and second data lines 545a and 545b cross each other to define first, second, third and fourth sub-pixels RSP, BSP, GSP and WSP. The first, second, third and fourth sub-pixels RSP, BSP, GSP and WSP constitute one pixel. The pixel is divided into a first area A1 and a second area A2 adjacent to each other along the first direction. The first area A1 includes the first and second sub-pixels RSP and BSP adjacent to each other along the second direction, and the second area A2 includes the third and fourth sub-pixels GSP and WSP adjacent to each other along the second direction. The fourth sub-pixel WSP has a smaller size than the first, second and third sub-pixels RSP, BSP and GSP, and the first, second and third sub-pixels RSP, BSP and GSP have substantially the same size according to one embodiment.

The second gate line 523b includes first, second, third and fourth portions. The first, second, third and fourth portions are sequentially connected to each other. The first and third portions are parallel to the first and second data lines 545a and 545b and overlap the first and second data lines 545a and 545b, respectively. The second and fourth portions are parallel to the first gate line 523a. The second portion is disposed in the first area A1, and the fourth portion is disposed in the second area A2. The second and fourth portions are not disposed on a line.

A thin film transistor Tr is formed on each crossing point of the first and second gate lines 523a and 523b and the first and second data lines 545a and 545b. The thin film transistor Tr includes a gate electrode 526, an active layer 534, a source electrode 547 and a drain electrode 549. A pixel electrode 563 is formed in each of the first, second, third and fourth sub-pixels RSP, BSP, GSP and WSP and is connected to the drain electrode 549.

The first area A1 has a first width W1, and the second area A2 has a second width W2. Thus, the first and second sub-pixels RSP and BSP have the first width W1, and the third and fourth sub-pixels GSP and WSP have the second width W2. The pixel has a third width W3 that is wider than the sum of the first and second widths W1 and W2.

The first sub-pixel RSP has a first length L1, the second sub-pixel BSP has a second length L2, the third sub-pixel GSP has a third length L3, and the fourth sub-pixel WSP has a fourth length L4. The first area A1 has a fifth length L5, and the second area A2 has a sixth length L6. The fifth length L5 is longer than the sum of the first and second lengths L1 and L2, and the sixth length L6 is longer than the sum of the third and fourth lengths L3 and L4. The fifth length L5 equals to the sixth length L6. The fifth and sixth lengths L5 and L6 correspond to a length of the pixel. The first length L1 and the second length L2 equal to each other, and the third length L3 is longer than the fourth length L4. Thus, the first and second lengths L1 and L2 are shorter than the third length L3 and longer than the fourth length L4 according to one embodiment. Here, since the first, second and third sub-pixels RSP, BSP and GSP have the same size, the first width W1 is wider than the second width W2.

In one embodiment, a common electrode may be formed on a color filter substrate facing the array substrate. Accordingly, only the pixel electrode is formed in each of the sub-pixels, and design is easy as compared with alternate embodiments.

Figure 13A:
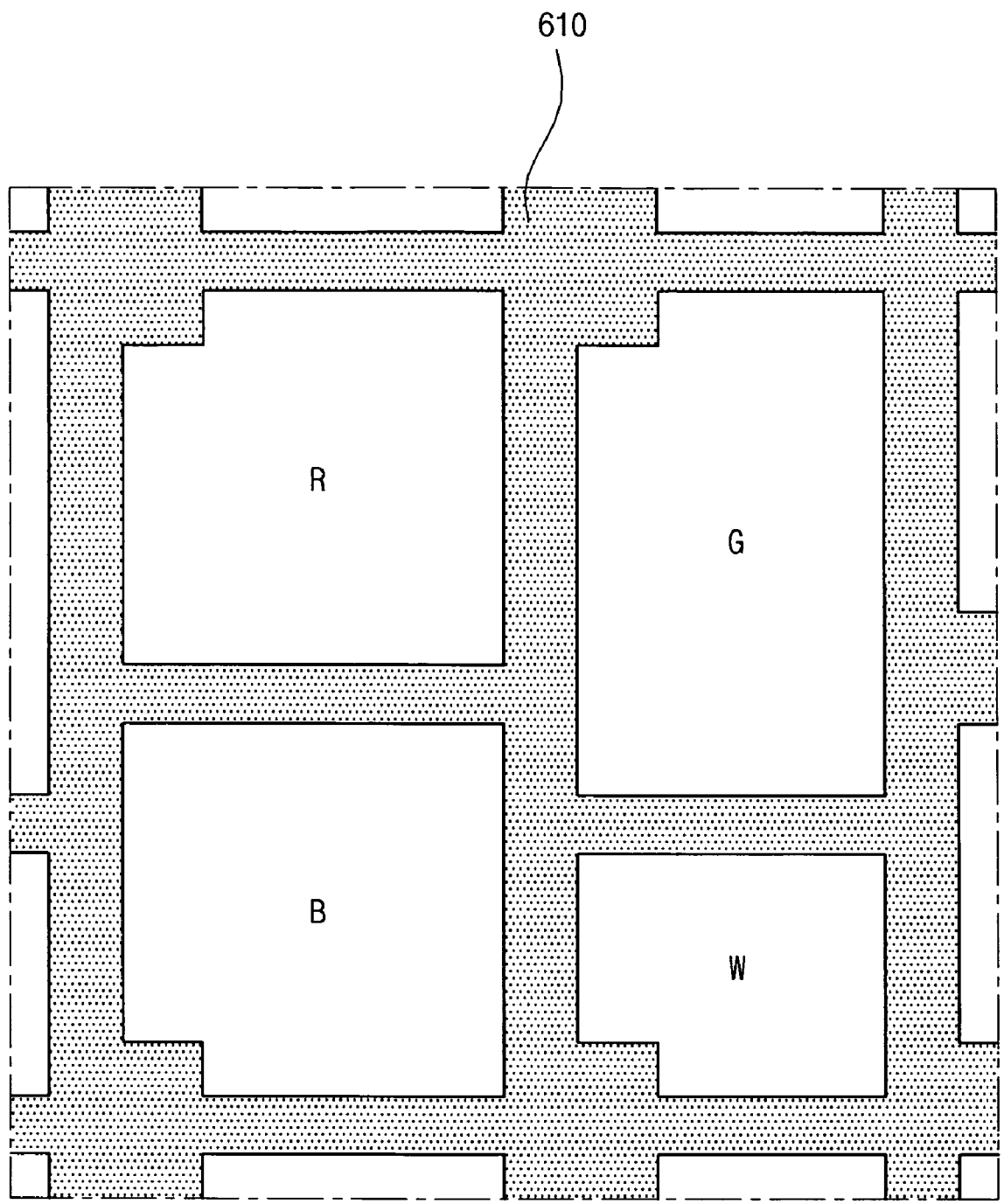
FIGS. 13A and 13B are plan views of a color filter substrate according to an embodiment.
Figure 13B:
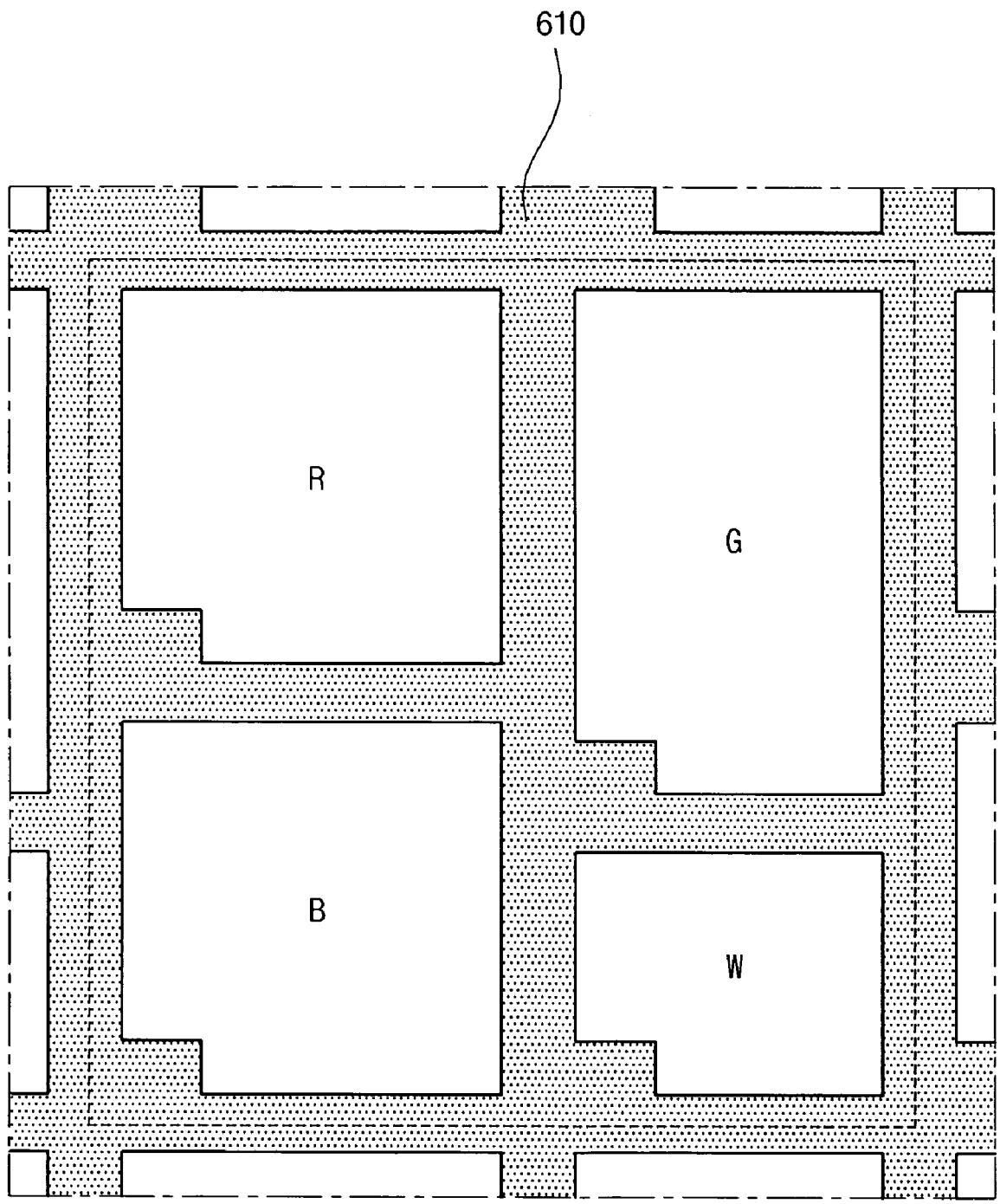

FIGS. 13A and 13B are plan views of a color filter substrate according to an embodiment. The color filter substrate can be used in multiple embodiments. The color filter substrate for one embodiment further includes a common electrode as compared to that of alternate embodiments.

In FIGS. 13A and 13B, red, blue, green and white color filter patterns R, B, G, and W are formed in first, second, third and fourth sub-pixels of various embodiments, respectively. The white color filter pattern W is smaller than the red, blue and green color filter patterns R, B and G, and the red, blue and green color filter patterns R, B and G have substantially the same size. A black matrix 610 is formed between adjacent color filter patterns R, B, G and W. The black matrix 610 corresponds to the gate lines, the data lines, the thin film transistors and the common line in one embodiment or corresponds to the gate lines, the data lines and the thin film transistors in an alternate embodiment. The color filter patterns R, B, G and W may overlap the black matrix 610. An overcoat layer may be further formed on the color filter patterns R, B, G and W. In the fourth sub-pixel, the overcoat layer may be substituted for the white color filter pattern W.

In one embodiment, a common electrode may be formed on substantially an entire surface of a substrate including the color filter patterns R, B, G and W and the black matrix 610. By changing the structure of the black matrix 610, the color filter substrate can be used for other examples of various embodiments.

In the present embodiments, since the white sub-pixel has a smaller size than other sub-pixels, the brightness and the color purities are increased. Therefore, image qualities are improved. Moreover, in the case of an LCD device having the common and pixel electrodes on the same substrate, the common and pixel electrodes are formed of a transparent conductive material, and thus the brightness is more increased. In addition, because the common electrode has a plate shape and overlaps the pixel electrodes, only the width of the pixel electrodes and the distance between the pixel electrodes are considered when the LCD device is designed. Accordingly, the degrees of freedom in designing the LCD device are increased.

It will be apparent to those skilled in the art that various modifications and variations can be made in the liquid crystal display device of the present invention without departing from the spirit or scope of the invention. Thus, it is intended that the present invention cover the modifications and variations of this invention provided they come within the scope of the appended claims and their equivalents.

What is claimed is:

1. An array substrate for a liquid crystal display device, comprising:
   a substrate;
   first and second gate lines on the substrate, wherein the first and second gate lines are arranged in a first direction;
   a common line arranged in the first direction and between the first and second gate lines;
   first and second data lines arranged in a second direction, the first and second data lines crossing the first and second gate lines and the common line to define a pixel, the pixel consisting of first, second, third and fourth sub-pixels, wherein the fourth sub-pixel is smaller than the first, second and third sub-pixels, and the first, second and third sub-pixels have the same size;
   a thin film transistor at each crossing point of the first and second gate lines and the first and second data lines;
   a common electrode in the first, second, third and fourth sub-pixels and connected to the common line; and
   pixel electrodes in the first, second, third and fourth sub-pixels and connected to the thin film transistor,
   wherein the first sub-pixel has a first width and a first length, the second sub-pixel has the first width and a second length, the third sub-pixel has a second width and a third length, and the fourth sub-pixel has the second width and a fourth length, wherein the first width is wider than the second width, the first length equals to the second length, and the first and second lengths are shorter than the third length and are longer than the fourth length, and wherein the first, second and third sub-pixels correspond to red, blue and green sub-pixels, and the fourth sub-pixel corresponds to a white sub-pixel.

2. The array substrate according to claim 1, wherein the fourth sub-pixel is less than 25% of the pixel.

3. The array substrate according to claim 1, wherein the common line includes first, second, third and fourth parts sequentially connected to each other, the first and third parts substantially parallel to the first and second data lines, the second and fourth parts substantially parallel to the first and second gate lines, the second part disposed between the first and second sub-pixels, and the fourth part disposed between the third and fourth sub-pixels.

4. The array substrate according to claim 3, wherein the first and third parts overlap the first and second data lines, respectively.

5. The array substrate according to claim 3, wherein the second part crosses the second data line, and the fourth part crosses the first data line.

6. The array substrate according to claim 3, wherein the second part crosses the first data line, and the fourth part crosses the second data line.

7. The array substrate according to claim 1, wherein the common line includes first, second and third parts, the first part connected to the second and third parts and substantially parallel to the first and second gate lines, the second part disposed between the first and second sub-pixels and indented toward the first gate line, and the third part disposed between the third and fourth sub-pixels and indented toward the second gate line.

8. The array substrate according to claim 1, wherein the pixel electrodes overlap the common electrode.

9. The array substrate according to claim 1, further comprising an auxiliary pixel electrode connecting line in each of the first, second, third and fourth sub-pixels, wherein the auxiliary pixel electrode connecting line has a closed curve shape corresponding to a peripheral portion of each of the first, second, third and fourth sub-pixels, and both ends of each of the pixel electrodes are connected to the auxiliary pixel electrode connecting line.

10. The array substrate according to claim 1, wherein the common electrode of the first sub-pixel is connected to the common electrode of the second sub-pixel, and the common electrode of the third sub-pixel is connected to the common electrode of the fourth sub-pixel.

11. The array substrate according to claim 1, wherein the common electrode and the pixel electrodes are formed of a transparent conductive material.

12. An array substrate for a liquid crystal display device, comprising:
a substrate;
first and second gate lines on the substrate and arranged in a first direction;
first and second data lines arranged in a second direction, the first and second data lines crossing the first and second gate lines to define a pixel consisting of first, second, third and fourth sub-pixels, wherein the fourth sub-pixel is smaller than the first, second and third sub-pixels, and the first, second and third sub-pixels have the same size;
a thin film transistor at a crossing point of the first and second gate lines and the first and second data lines; and
a pixel electrode in the first, second, third and fourth sub-pixels and connected to the thin film transistor,
wherein the first sub-pixel has a first width and a first length, the second sub-pixel has the first width and a second length, the third sub-pixel has a second width and a third length, and the fourth sub-pixel has the second width and a fourth length, wherein the first width is wider than the second width, the first length equals to the second length, and the first and second lengths are shorter than the third length and are longer than the fourth length, and wherein the first, second and third sub-pixels correspond to red, blue and green sub-pixels, and the fourth sub-pixel corresponds to a white sub-pixel.

13. The array substrate according to claim 12, wherein the second gate line includes first, second, third and fourth portions sequentially connected to each other, the first and third portions substantially parallel to the first and second data lines, the second and fourth portions substantially parallel to the first and second gate lines, the second portion disposed between the first and second sub-pixels, and the fourth portion disposed between the third and fourth sub-pixels.

14. The array substrate according to claim 13, wherein the first and third portions overlap the first and second data lines, respectively.

15. A color filter substrate for a liquid crystal display device including a pixel that consists of first, second, third and fourth sub-pixels, comprising:
a substrate;
a black matrix on the substrate; and
red, green, blue and white color filter patterns on the substrate in the first, second, third and fourth sub-pixels, respectively, wherein the fourth sub-pixel is smaller than the first, second and third sub-pixels, and the first, second and third sub-pixels have the same size,
wherein the first sub-pixel has a first width and a first length, the second sub-pixel has the first width and a second length, the third sub-pixel has a second width and a third length, and the fourth sub-pixel has the second width and a fourth length, wherein the first width is wider than the second width, the first length equals to the second length, and the first and second lengths are shorter than the third length and are longer than the fourth length.

16. The color filter substrate according to claim 15, further comprising a common electrode covering the black matrix and the red, green, blue and white color filter patterns.

17. A liquid crystal display device, comprising:
first and second substrates, on which a pixel consisting of first, second, third and fourth sub-pixels is defined; and
a liquid crystal layer between the first and second substrates,
wherein the fourth sub-pixel is smaller than the first, second and third sub-pixels, and the first, second and third sub-pixels have the same size,
wherein the first sub-pixel has a first width and a first length, the second sub-pixel has the first width and a second length, the third sub-pixel has a second width and a third length, and the fourth sub-pixel has the second width and a fourth length, wherein the first width is wider than the second width, the first length equals to the second length, and the first and second lengths are shorter than the third length and are longer than the fourth length, and wherein the first, second and third sub-pixels correspond to red, blue and green sub-pixels, and the fourth sub-pixel corresponds to a white sub-pixel.

18. The device according to claim 17, wherein the fourth sub-pixel includes a white color filter pattern.

19. A pixel in a liquid crystal display device comprising:
a first sub-pixel;
a second sub-pixel;
a third sub-pixel; and
a fourth sub-pixel, wherein the fourth sub-pixel is smaller than the first sub-pixel, the second sub-pixel and the third sub-pixel, and the first, second and third sub-pixels have the same size,
wherein the first sub-pixel has a first width and a first length, the second sub-pixel has the first width and a second length, the third sub-pixel has a second width and a third length, and the fourth sub-pixel has the second width and a fourth length, wherein the first width is wider than the second width, the first length equals to the second length, and the first and second lengths are shorter than the third length and are longer than the fourth length, and wherein the first, second and third sub-pixels correspond to red, blue and green sub-pixels, and the fourth sub-pixel corresponds to a white sub-pixel.

20. The pixel of claim 19, wherein the fourth sub-pixel includes a white color filter pattern.

* * * * *